(12) United States Patent
Karakus et al.

(10) Patent No.: US 7,807,263 B2
(45) Date of Patent: Oct. 5, 2010

(54) LAMINATED PANEL

(75) Inventors: David Karakus, Ansonia, CT (US); Stephen Canary, Westfield, MA (US)

(73) Assignee: Panolam Industries International, Inc., Shelton, CT (US)

( * ) Notice: Subject to any disclaimer, the term of this patent is extended or adjusted under 35 U.S.C. 154(b) by 647 days.

(21) Appl. No.: 11/564,094

(22) Filed: Nov. 28, 2006

(65) Prior Publication Data

US 2008/0107891 A1 May 8, 2008

Related U.S. Application Data

(60) Provisional application No. 60/864,477, filed on Nov. 6, 2006.

(51) Int. Cl.
*B32B 5/16* (2006.01)
*B32B 29/00* (2006.01)

(52) U.S. Cl. .............. 428/323; 428/331; 428/532; 428/537.5

(58) Field of Classification Search ............ None
See application file for complete search history.

(56) References Cited

U.S. PATENT DOCUMENTS

| | | | | |
|---|---|---|---|---|
| 3,928,706 | A | 12/1975 | Gibbons | 428/323 |
| 3,968,291 | A | 7/1976 | Chevallier | 428/203 |
| 5,344,704 | A | 9/1994 | O'Dell et al. | 428/323 |
| 5,545,476 | A | 8/1996 | O'Dell et al. | 428/327 |
| 5,952,093 | A | 9/1999 | Nichols et al. | 428/323 |
| 5,989,696 | A | 11/1999 | McCarthy et al. | 428/288 |
| 6,685,993 | B1 | 2/2004 | Hansson et al. | 427/551 |
| 7,026,038 | B2 | 4/2006 | Franzoi et al. | 428/195.1 |
| 2005/0287348 | A1 | 12/2005 | Faler et al. | 428/315.5 |
| 2006/0029793 | A1 | 2/2006 | Overholt et al. | 428/325 |
| 2006/0063109 | A1* | 3/2006 | Choi et al. | 430/300 |
| 2006/0110615 | A1 | 5/2006 | Karim et al. | 428/500 |

OTHER PUBLICATIONS

"Montmorillonite", Wikipedia, the free encyclopedia, http://en.wikipedia.org/wiki/Montmorillonite.
"Polymer Grade Montmorillonites", Nanocor Technical Data Sheet, www.nanocor.com.
"Laponite®-Performance-Focused Attributes in Rheology and Specialty Film Forming Applications", Chembrief, Jun. 2001, vol. 1, Issue 2, Southern Clay Products, Inc.
"Laponite RD: The Clear Leader", Product Bulletin/ Laponite®, Southern Clay Products, Inc.
Goodwin et al., "Structure and Interactions in Aqueous Laponite Dispersions", Scientific Reports, Sols, Gels & Emulsions, pp. 286-287.

* cited by examiner

*Primary Examiner*—Sheeba Ahmed
(74) *Attorney, Agent, or Firm*—O'Shea Getz P.C.

(57) ABSTRACT

A method for the production of a laminate is provided, comprising the steps of: 1) providing a stack of layers including a decorative layer, a core layer, and optionally an overlayer; 2) impregnating one or both of the decorative layer and overlayer with a resin formulation that includes nanoclay particles disposed within a thermoset resin, wherein the concentration of the nanoclay particles within the thermoset resin is great enough to form a physical barrier within the resin and low enough to avoid a hazy appearance; and 3) subjecting the stack of layers to sufficient heat and pressure to cause the layers to bond to one another. According to an aspect of the present invention, a laminate is provided producible by the above-described method.

14 Claims, 2 Drawing Sheets

LAMINATED PANEL

This application claims the benefit of and incorporates by reference essential subject matter disclosed in U.S. Provisional Patent Application No. 60/864,477 filed on Nov. 6, 2006.

BACKGROUND OF THE INVENTION

1. Field of the Invention

The present invention relates to laminated panels in general and, more particularly, to a laminated panel having a surface layer with improved durability and chemical resistance and methods for manufacturing the same.

2. Background Information

Many of today's chemical-resistant laminates are characterized by high cost, poor performance, or both. Chemical resistance is typically defined in terms of standards promulgated by the Scientific Equipment and Furniture Association (SEFA), and in particular the standard referred to as SEFA 8.1 (www.sefalabs.com). The aforementioned standard is a chemical spot test wherein a laminate is exposed to one or more of 49 different chemical reagents individually applied to the surface of a laminate and left there for a predetermined period of time. At the end of the predetermined time period, the reagent is removed and the laminate is evaluated for changes caused by the reagent. The ability of the laminate to withstand chemical degradation is the measure of the laminate's chemical resistance.

Some laminates provide chemical resistance by utilizing a relatively thick resin overlayer. The thick resin overlayer can give the laminate an undesirable hazy appearance and can also significantly increase the cost of the laminate. Other laminates utilize a fluoropolymer barrier to increase the chemical resistance of the laminate. Fluoropolymer barriers provide desirable resistance against certain chemicals, but offer relatively little protection against certain solvents. Still other laminates use E-B cured foils to create chemical resistance. Many E-B foils are not suitable for high-pressure laminate applications, however, as they cannot handle the relatively high pressures utilized in the lamination process. To be suitable, the basis weight of the foil must be increased, along with the degree of cure and the amount of topcoat applied, which makes these foils more costly.

The ability of a laminate to resist abrasive wear is a highly desirable quality in a laminate. Abrasion-resistant laminates often utilize an overlayer that includes a high concentration of abrasion resistant particles. The abrasion resistant particles protect the overlayer and adjacent decor layer against undesirable wear within the decor layer. Unfortunately, the abrasion resistant particles that help protect the laminate against abrasion also wear the machinery used in the laminate manufacturing process. Laminates are often formed between the press plates of a batch press under elevated temperature and pressure. The abrasion resistant particles within the outermost layer (e.g., an overlayer) wear the very expensive press plates, thereby shortening their useful life and increasing the overall cost of the process. Wear is particularly a problem for textured press plates. The "peaks and valleys" of the textured press plates create uneven loading, further accelerating wear of the "peaks" and other sharp features of the press plates.

In addition to wear and chemical resistance, an overlayer should have desirable clarity; e.g., a lack of undesirable tint or haziness (lack of clarity referred to hereinafter as "haziness"). Haziness can be caused by a variety of things, including impurities and/or the size of particles added to the resin formulation. Resin formulations often include additives (e.g., thickening agents, suspension agents, dispersants, etc.) to improve processing and physical qualities. Additives in solid particle form having a particle size of approximately two-hundred and fifty nanometers (250 nm) can cause haziness because of their size relative to the wavelength range of visible light.

What is needed, therefore, is a laminated panel and a method for making the same, having a desirable level of chemical resistance and durability for a given period of time, one that possesses desirable clarity, and one that is cost-effective.

SUMMARY OF THE INVENTION

According to the present invention, a method for the production of a laminate is provided, comprising the steps of: 1) providing a stack of layers including a decorative layer, a core layer, and optionally an overlayer; 2) impregnating one or both of the decorative layer and overlayer with a resin formulation that includes nanoclay particles disposed within a thermoset resin, wherein the concentration of the nanoclay particles within the thermoset resin is great enough to form a physical barrier within the resin and low enough to avoid a hazy appearance; and 3) subjecting the stack of layers to sufficient heat and pressure to cause the layers to bond to one another.

According to an aspect of the present invention, a laminate is provided producible by the above-described method.

In some embodiments, the laminate further includes a backer layer attached to a side of the core layer opposite the decorative layer.

The present invention laminated panel is a cost-effective and easily-produced laminate having desirable performance properties, including the ability to resist chemical degradation from many of the 49 chemicals used within the SEFA 8.1 testing standard. The present laminate provides the desirable chemical resistance and yet does so with a desirable clarity that does not cause an underlying decorative design or color to appear hazy. This is a distinct commercial advantage. Another advantage of the present invention is that the use of the nanoclay particles is not detrimental to postforming properties of the laminate at the levels used. Still another advantage of the present invention is that the resin formulation with nanoclay particles improves certain properties of the laminate, including resistance to moisture and durability. Still another advantage of the present invention is that it appears that an enhanced degree of curing of the resin occurs in the vicinity of the synthetic particles disposed within the resin. The enhanced degree of cure promotes barrier formation which in turn increases the ability of the laminate to resist chemical degradation and wear.

These and other features and advantages of the present invention will become apparent in light of the drawings and detailed description of the present invention provided below.

DETAILED DESCRIPTION OF THE INVENTION

Figure 1:
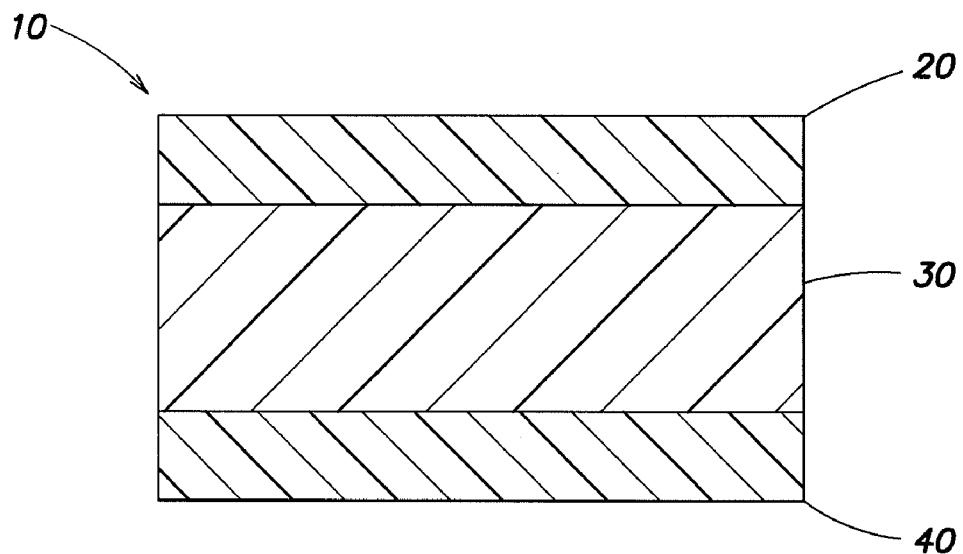
FIG. 1 is a cross sectional view (not to scale) of the superimposed constituent layers according to the first embodiment of the present invention.
Figure 2:
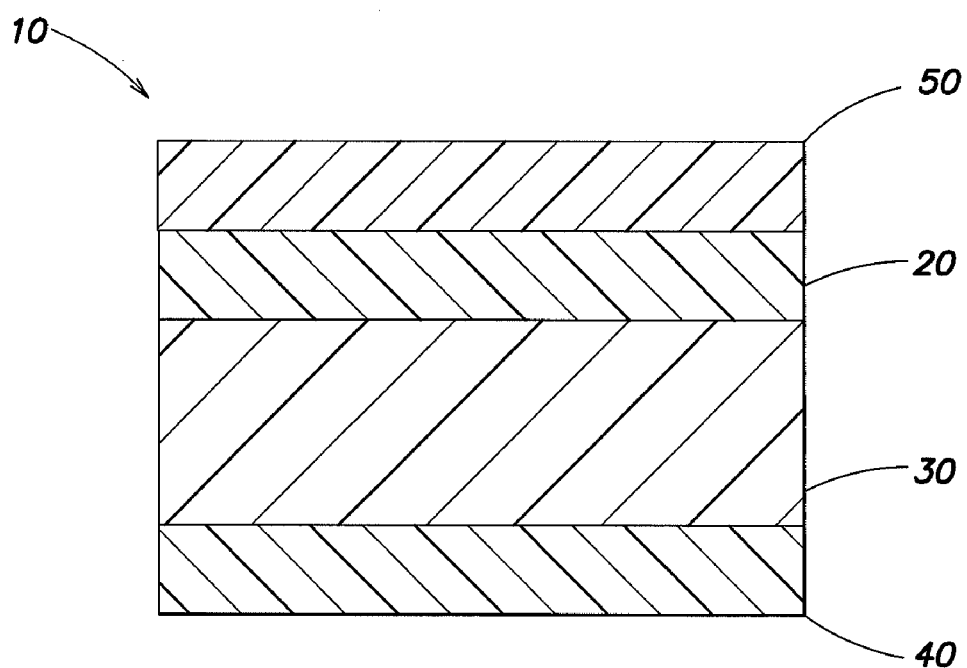
FIG. 2 is a cross sectional view (not to scale) of the superimposed constituent layers according to another embodiment of the present invention.
Figure 3:
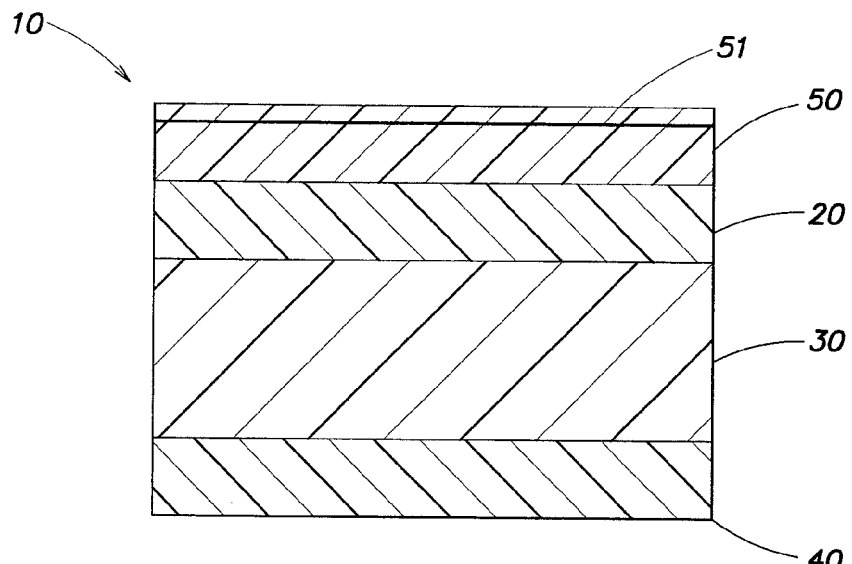
FIG. 3 is a cross sectional view (not to scale) of the superimposed constituent layers according to another embodiment of the present invention.

Referring to FIGS. 1-3, a laminated panel 10 (or "laminate") having improved chemical resistance and durability is provided. As used herein, the term "chemical-resistant" refers to the ability of the laminated structure 10 to protect itself against degradation from exposure to aggressive chemicals (e.g., SEFA 8.1 standard chemicals) for a given period of time. The laminate 10 includes a decorative layer 20 superimposed onto a core layer 30. In some embodiments, a backer layer 40 is disposed on a surface of the core layer 30 opposite the surface with the superimposed decorative layer 20. In some embodiments, an overcoat layer 50 may be superimposed onto the decorative layer 20 and/or the backer layer 40 opposite the core layer 30.

The decorative layer 20 includes one or more sheets or webs of paper containing a printed decorative pattern or a solid color. As will be described below, the decorative layer 20 may be dry (i.e., not impregnated with resin) or it may be at least partially impregnated with a resin. The resin may be a resin formulation as described below, or other resin compatible with the resin formulation.

The core layer 30 may include one or more sheets of kraft paper impregnated with a phenolic resin, as is known in the art. In some embodiments (e.g., low pressure laminates), the core layer 30 may comprise materials other than the kraft paper, including plywood, medium density fiberboard, high density fiberboard, particleboard, recycled plastic, ABS/PC, nylon, or PVC. In these embodiments, the decorative layer 20 is typically thermofused onto the core layer 30 to produce the laminated structure 10.

In those laminate embodiments that include a backer layer 40, the backer layer 40 is bonded to the core layer 30 on the side of the core layer 30 opposite the decorative layer 20. The backer layer 40 comprises one or more sheets that typically include a cellulosic material which may be coated or at least partially impregnated with a thermoset resin and partially cured. Acceptable backer layer 40 materials include fire retardant kraft paper, or a decorative paper. The decorative paper used within the backer layer 40 may have the same printed pattern or solid color as the decorative layer 20, and may be impregnated with the same resin or resin formulation as the decorative layer 20. Typically, the backer layer 40 will have a basis weight that is approximately equal to the basis weight of the decorative layer 20.

Referring to FIGS. 2 and 3, in those laminate 10 embodiments that include an overcoat layer 50, the overcoat layer 50 may be disposed on the upper surface of one or both of the decorative layer 20 and backer layer 40. The overcoat layer 50 may comprise only resin formulation, or it may comprise resin formulation plus one or more overlay sheets 51 typically comprised of a cellulosic material. If overlay sheets 51 are included, the sheets 51 may be applied to the laminate stack dry (i.e., not impregnated) or they may be at least partially impregnated with the resin formulation. When an overcoat layer 50 is included in the laminate 10, the decorative layer 20 and/or the backer layer 40 may be applied to the laminate stack dry (i.e., not impregnated), or impregnated with the resin formulation, or impregnated with a different resin.

The resin formulation preferably includes a thermoset resin. Examples of acceptable thermoset resins include melamine-formaldehyde resins, phenol-formaldehyde resins, etc. Thermoset resins are well known in the art and are commercially available. The properties of specific resins will not be described in further detail other than to say that specific parameters of the resin are chosen to best accommodate the application at hand; e.g., resins and additives are selected based on their ability to provide chemical-resistance and bonding strength, fire-resistance, overall panel flexibility, resistance to degradation due to heat, moisture, or radiation cycles, etc. for the application at hand.

Figure 4:
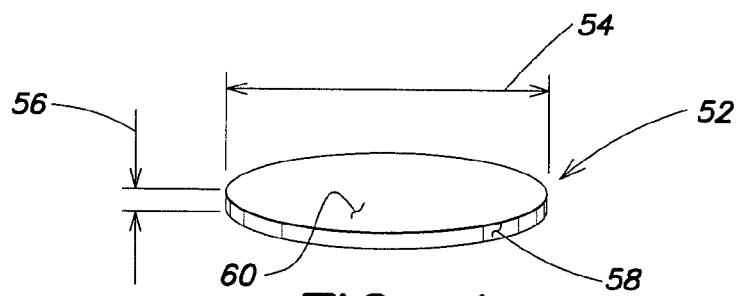
FIG. 4 is a diagrammatic view of a synthetic layered silicate particle.

Referring to FIG. 4, the resin formulation includes a predetermined amount of nanoclay particles 52 to improve the wear resistance and chemical resistance of the laminate. The predetermined amount is typically chosen to create a concentration wherein the weight of the particles 52 is in the range of about 0.005% to 1.00% of the total weight of the resin formulation. This range yields a synthetic particle weight concentration within the resin formulation in the range of about 0.01% to 2.00% of the total weight of the cured resin. Preferably, however, the synthetic particles 52 are in a range of about 0.01% to 1.0% of the total weight of the total weight of the resin formulation. The lower weight concentration of the nanoclay particles within the resin formulation yields acceptable wear resistance and chemical resistance, and more desirable clarity.

In a preferred embodiment, the nanoclay particles 52 are synthetic layered silicate particles 52. The synthetic silicate particles 52 preferably have a mean particle size of less than fifty nanometers (50 nm). It is our experience that synthetic silicate particles having a mean particle size of about twenty-five nanometers (e.g., a wafer-shape with a width 54 of approximately 25 nm and a thickness 56 of approximately 1 nm) work particularly well. The particles 52 are insoluble in water, but hydrate, swell, and become colorless when mixed with resin. Synthetic silicate particles having a mean particle size of less than fifty nanometers (50 nm) are preferred for several reasons. First, particles having a mean particle size of less than one-hundred nanometers (100 nm) do not appreciably impede light passage through the cured resin and thereby can be added as an additive without noticeable effect on the clarity of the outermost layer. Second, particles having a mean particle size of less than fifty nanometers (50 nm) provide a greater amount of collective particle surface area within the resin formulation than would be provided by the same volume of particles having a larger mean particle size. The increased amount of particle surface area permits the formation of more physical and chemical bonds with the resin than would be possible with less collective surface area, which bonds in turn increase the wear resistance and chemical resistance of the layer comprising the cured resin formulation. Synthetic silicate particles are also preferred because they contain relatively low levels of impurities (e.g., in contrast to naturally occurring additives that must be mined) which can obscure clarity. Southern Clay Products, Inc. of Gonzales Tex., USA offers a family of synthetic layered silicate particles under the trademark Laponite® (e.g., Laponite RD, Laponite XLG, Laponite RDS, etc.). The Laponite® product particles comprise hydrous sodium lithium magnesium silicate.

Figure 5:
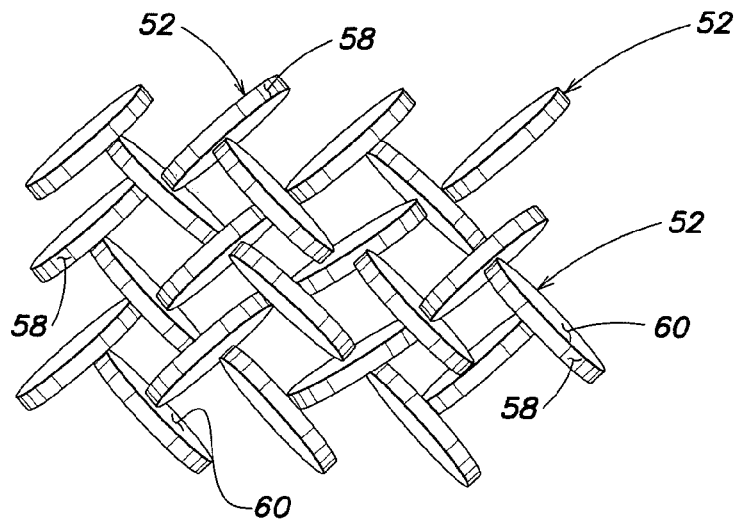
FIG. 5 is a diagrammatic view of a plurality of synthetic layered silicate particles arranged by electrostatic attraction.

Referring to FIGS. 4 and 5, the synthetic layered silicate particles 52 are also preferred because they are electrostatically charged particles, having a positive charge around the edges 58 of the particles 52 and a negative charge on the faces 60 of the particles 52 (or vice versa). As a result of the electrostatic charges present with the individual particles 52, it is believed that the particles 52 arrange themselves within the uncured resin in a structure that has been referred to as a "house of cards", where the edge 58 of a first particle 52 is attracted to and disposed adjacent the face 60 of a second particle 52, and so on (see FIG. 5). After the laminate is cured, the arrangement of the particles 52 remains and creates a physical barrier disposed within the resin. The preferred size of the synthetic silicate particles also facilitates the formation of the aforesaid physical barrier.

In other embodiments, the nanoclay particles include a clay mineral from the smectite family that may be in a naturally occurring form or a surface modified form. Montmorillonite is an example of a smectite clay mineral that can be used as a nanoclay particle. Montmorillonite swells with the addition of water.

Other additives to the resin formulation include a catalyst, and a release agent. The relative percentages of catalyst and release agent appropriate for the resin formulation can be varied to suit particular applications, and are known within the art.

The present laminated panel 10 may be manufactured using different processes that subject the laminate 10 to elevated temperatures and pressures for a period of time sufficient to produce adequate bonding between the various layers comprising the laminate. High-pressure versions of the present laminate 10 are generally processed at a temperature in the range from about 110° C. to about 170° C., and at a pressure within the range of about 500 psi to about 1600 psi. Curing temperatures and pressures are typically selected based on the specific resin in use and the ultimate desired properties of the cured laminate. Curing temperatures can also be manipulated to suit the speed of the process; e.g., higher curing temperatures can be used at higher processing speeds and lower curing temperatures can be used at lower processing speeds.

It is our finding that an enhanced degree of cure occurs within the resin formulation in the vicinity of the synthetic layered silicate particles disposed within the resin during the manufacturing process. It is our belief that the relatively high surface area and composition of the particles play a role in the occurrence of the additional cure. The concentration of the synthetic layered silicate particles within the cured resin, and the physical barrier that they create, result in a region of resin having an enhanced cure. The enhanced cure promotes the wear resistance and chemical resistance of the laminate.

The following examples are illustrative of the present laminate 10 and processes for manufacturing the same. These examples are offered to illustrate specific embodiments of the laminate 10 and processes for making the same, and do not constitute any limitation with regard to the subject matter of the invention.

Example 1

A high-pressure version of the present laminate 10 is manufactured using a non-continuous press. A build-up comprising a core layer 30 and a decorative layer 20 is made in a superimposed relationship. The core layer 30 comprises at least one sheet of kraft paper impregnated with a phenolic resin such as phenol-formaldehyde resin.

The decorative layer 20 includes a paper sheet partially impregnated with a thermoset resin formulation. The partial impregnation is carried out so that about 40% to 60% of the total amount of resin formulation necessary for full saturation is used. The resin formulation includes a melamine-formaldehyde resin and synthetic silicate particles (e.g., Laponite® R brand synthetic layered silicate) in a concentration within the range of about 0.005% to about 1.0% of the final weight of the resin formulation, and catalysts and release agents as required. The decorative sheet 20 is preferably dried to a volatile content of about 5.0% to about 15.0% for handleability. The decorative sheet 20 is most preferably dried to a volatile content of about 9.0% to about 12.0%.

The build-up is placed between the steel caul plates (also know as "press plates") of the non-continuous press and is subjected to a pressure in the range of about 700 psi to 1200 psi. Once the selected pressure is reached, the press is heated to a temperature of about 140° C. The press is held at the aforesaid pressure and temperature for a heating cycle of about 5 to 50 minutes depending on application, the specific constituents of the resin, etc. (total cycle times are in the range of up to about 60 minutes). The pressed laminate 10 is then cooled while still in the non-continuous press under pressure until the temperature of the laminate decreases to about 60° C. or below. The pressure is then released and the chemical-resistant laminate is removed from the non-continuous press. The thickness of the resulting laminate 10 will depend on the number of sheets within the core layer 30 and within the decorative layer 20. Maintaining the laminate 10 within the press under pressure while the laminate 10 is cooled improves the flatness of the final product laminate.

Example 2

A high-pressure version of the present laminate 10 is manufactured in a manner similar to that described within Example 1 above. In this example, an overcoat layer 50 of the resin formulation is subsequently applied to the surface of the dried decorative layer 20, which surface is disposed away from the core layer 30. The build-up is placed between the steel caul plates of the non-continuous press and is subjected to the processing steps disclosed in Example 1.

Example 3

A high-pressure version of the present laminate 10 is manufactured in a manner similar to that described within Example 2 above. In this example, the overcoat layer 50 of resin is either applied to the decorative sheet 20 in combination with an overlay sheet 51, or is replaced by a overcoat layer 50 comprising an overlay sheet 51 at least partially impregnated with the resin formulation. The build-up is placed between the steel caul plates of the non-continuous press and is subjected to the processing steps disclosed in Example 1.

Example 4

A high-pressure version of the present laminate 10 is manufactured in a manner similar to that described in Example 3 where the overcoat layer 50 comprises an overlay sheet 51 at least partially impregnated with the resin formulation. In this embodiment, the decorative layer 20 may be dry, and therefore not impregnated with the resin formulation.

Example 5

A high-pressure version of the present laminate 10 is manufactured in a manner similar to that described in Examples 1, 2, 3, or 4, except that the laminate 10 includes a backer layer 40 disposed on the side of the core layer 30 opposite the decorative layer 20. The backer layer 40 may comprise a similar basis weight as that of the decorative layer, thereby enabling it to balance the laminate 10. The backer layer 40 may comprise materials such as fire retardant kraft paper, or kraft paper treated with a fast cure phenolic resin.

Example 6

A low-pressure version of the present laminate 10 is manufactured using a non-continuous press. A build-up comprising a decorative layer 20 and a core layer 30 is made in a superimposed relationship. The decorative layer 20 is similar to that disclosed within Example 1. The core layer 30 comprises one or more of the following materials: plywood, medium density fiberboard, high density fiberboard, particleboard, recycled plastic, ABS/PC, nylon, or PVC. In this embodiment, the decorative layer 20 is thermofused onto the core layer 30 to produce the laminated structure 10.

The build-up is placed between the steel caul plates of the non-continuous press and is subjected to a pressure in the range of about 300 to 400 psi. The press is pre-heated to a temperature in the range of about 180° C. to 210° C. Once the predetermined pressure is reached, the press is held at the aforesaid pressure and temperature for a heating cycle in the range of about 20 to 60 seconds. The pressure may then be released and the pressed laminate 10 may be removed from the non-continuous press without prior cooling.

It will be obvious to those skilled in the art that various changes may be made without departing from the scope of the present invention and that the invention is not to be considered limited to what is described and exemplified in the specification.

What is claimed is:

1. A laminated panel, comprising:
   a core layer having a first side and a second side, which second side is opposite the first side;
   a decorative layer bonded to the first side of the core layer; and
   an overcoat layer disposed on a side of the decorative layer opposite the core layer, said overcoat layer containing nanoclay particles disposed in a layer of cured thermoset resin, which particles have a mean particle size of about 50 nm or less,
   wherein thermoset resin within the overcoat layer, decorative layer and core layer is cured and bonds the layers together to form the panel.

2. The laminated panel of claim 1, wherein the nanoclay particles comprise a smectite clay mineral.

3. The laminated panel of claim 2, wherein the smectite clay mineral includes montmorillonite.

4. The laminated panel of claim 1, wherein the nanoclay particles comprise synthetic layered silicate particles.

5. The laminated panel of claim 4, wherein the synthetic layered silicate particles are in the range of about 0.01% to 2.00% of the weight of the overcoat layer.

6. The laminated panel of claim 4, wherein the core layer comprises a plurality of sheets of kraft paper.

7. The laminated panel of claim 4, further comprising a backer layer bonded to the second side of the core layer.

8. The laminated panel of claim 4, wherein the overcoat layer includes one or more overlay sheets comprising a cellulose material.

9. The laminated panel of claim 4, wherein substantially all of the synthetic layered silicate particles are wafer-shaped, with an edge extending between a pair of faces.

10. The laminated panel of claim 9, wherein the edge of each particle has a first electrical charge, and the faces have a second electrical charge which is opposite from the first electrical charge.

11. A laminated panel, comprising:
    a core layer;
    a decorative layer bonded to the first side of the core layer, and impregnated with a thermoset resin formulation containing a concentration of nanoclay particles sufficient to form a physical barrier within the resin, which barrier is resistant to chemical degradation,
    wherein thermoset resin within the decorative layer and core layer is cured and bonds the layers together to form the panel.

12. The laminated panel of claim 11, wherein the nanoclay particles include synthetic layered silicate particles.

13. The laminated panel of claim 12, wherein the synthetic layered silicate particles are in the range of about 0.01% to 4.00% of the weight of the resin impregnating the decorative layer.

14. A laminated panel, comprising:
    a core layer having a first side and a second side, which second side is opposite the first side;
    a decorative layer bonded to the first side of the core layer; and
    an overcoat layer disposed on a side of the decorative layer opposite the core layer, said overcoat layer containing a chemical resistance barrier disposed in a layer of cured thermoset resin, which barrier is formed from synthetic layered silicate particles at least some of which are electrically attracted to one another.

* * * * *